United States Patent [19]

Takekado

[11] Patent Number: 4,760,480
[45] Date of Patent: Jul. 26, 1988

[54] HEAD ACCESS MECHANISM FOR MAGNETIC DISK MEMORY DEVICE

[75] Inventor: Shigeru Takekado, Tokyo, Japan

[73] Assignee: Kabushiki Kaisha Toshiba, Kawasaki, Japan

[21] Appl. No.: 22,500

[22] Filed: Mar. 9, 1987

Related U.S. Application Data

[63] Continuation of Ser. No. 619,200, Jun. 11, 1984, abandoned.

[30] Foreign Application Priority Data

Sep. 27, 1983 [JP] Japan .................. 58-176884

[51] Int. Cl.$^4$ .................. G11B 5/55; G11B 21/08
[52] U.S. Cl. .................. 360/106; 310/13
[58] Field of Search .................. 360/106, 104–105, 360/109, 75, 129, 97–99; 310/13, 27, 12

[56] References Cited

U.S. PATENT DOCUMENTS

| | | | |
|---|---|---|---|
| 3,735,163 | 5/1973 | Dijkstra et al. | 310/13 |
| 3,886,387 | 5/1975 | Graham et al. | 310/256 |
| 4,287,445 | 9/1981 | Lienau | 310/13 |
| 4,305,105 | 12/1981 | Ho et al. | 360/106 |
| 4,339,778 | 7/1982 | Wise | 360/98 X |
| 4,377,761 | 3/1983 | Staciokas | 310/12 |
| 4,393,425 | 7/1983 | Wright | 360/106 X |
| 4,414,594 | 11/1983 | Farmer et al. | 360/106 |
| 4,426,669 | 11/1984 | Bryer | 360/106 |
| 4,427,905 | 1/1984 | Sutton | 310/27 |

FOREIGN PATENT DOCUMENTS 58-17989  4/1983  Japan .

OTHER PUBLICATIONS

Bakken et al., "Self-Locating and Adhering Flux Shield," IBM TDB, Aug. 1983, vol. 26, No. 3B, pp. 1679–1680.

Primary Examiner—John H. Wolff
Assistant Examiner—David J. Severin
Attorney, Agent, or Firm—Foley & Lardner, Schwartz, Jeffery, Schwaab, Mack, Blumenthal & Evans

[57] ABSTRACT

A head access mechanism of the magnetic disk memory device for memorizing information by means of a rigid or flexible magnetic disk. The head access mechanism is equipped with a moving-coil type linear motor comprising an E-shaped yokes with two magnetic gaps and a movable coil. The yokes are arranged so as to produce the two magnetic gaps side by side on the extension itself of the plane of placement of the magnetic disk and/or plane parallel to it, with their openings opposing the magnetic disk. Magnets are installed on each of the magnetic gaps to align the magnetic flux toward the central yoke of the yokes. A movable coil is wound through the two magnetic gaps encircling repeatedly around the central yoke on which an indentation is provided, which extends parallel to the magnetic gaps. A carriage, which is housed mobile in side indentation and joined to said movable coil, supports the magnetic heads so as to restrain the magnetic coil, heads to be placed between the two magnetic loops that are formed by the pairs of magnets and the yokes.

1 Claim, 7 Drawing Sheets

HEAD ACCESS MECHANISM FOR MAGNETIC DISK MEMORY DEVICE

This application is a continuation of application Ser. No. 619,200, filed June 11, 1984, now abandoned.

BACKGROUND OF THE INVENTION

1. Field of the invention

The present invention relates to a head access mechanism of the magnetic disk memory device for memorizing information by means of a rigid or flexible magnetic disk, more particularly, to a linear drive head access mechanism.

2. Description of the Prior Art

Generally, a magnetic disk device for memorizing information by means of a rigid or flexible magnetic disk is equipped with a head access mechanism for moving an electromagnetic head to a desired position on the disk surface when memorizing or reading an information.

A known type of head access mechanism includes a yoke in the shape of the letter E whose pair of magnetic gaps open on either side of the extension of the magnetic disk plane, a movable coil wound around a central portion of the yoke by passing through the magnetic gaps in turn, and an electromagnetic head which is attached to the movable coil via a carriage. Therefore, the magnetic head is allowed to gain access to a desired spot on the magnetic disk by displacing the movable coil along the central yoke.

In this type of prior art head access mechanism, the plane of placement of the magnetic disk and the loops of the magnetic circuits formed by the yokes are mutually orthogonal so that the maximum magnetic flux leak occurs in the extension of the plane which is perpendicular to the magnetic flux direction within the magnetic gaps. Since the straight line joining the magnetic head and the magnetic disk intersects the plane mentioned above, the magnetic head will find itself in an extremely strong magnetic flux leak in case the separation between the magnetic head and the yokes is not large enough. Therefore, in order to avoid a deterioration in the electromagnetic characteristics of the head it becomes necessary to maintain a sufficient separation between the magnetic head and the yokes, which in turn causes an increase in size and weight of the carriage, resulting in a degeneration of the energy efficiency due to an increased energy consumption required for driving the carriage.

Moreover, a large space is required along the vertical direction due to the structure of the yokes whose magnetic gaps open, opposing to each other, at the outer periphery of the magnetic disk in the upper and lower sides of the extension of the magnetic disk plane. In particular, when a rigid or flexible magnetic disk is used for situations where a high density recording is feasible, there exist cases wherein the use of stacked magnetic disks along the gravity direction is unnecessary. That is, in such a case there has persisted a problem that the large size of the head access mechanism takes up an excessive space along the gravity direction.

SUMMARY OF THE INVENTION

The object of the present invention is to provide a small head access mechanism with a high energy efficiency.

Another object of the present invention is to provide a small head access mechanism which allows to realize an improvement in the magnetic characteristics of the magnetic head.

A further object of the present invention is to provide a head access mechanism which reduces the flux leak of the magnetic circuit in the vicinity of the magnetic head.

A still further object of the present invention is to provide a head access mechanism which allows to make the carriage small in size and weight in accordance with the reduction in the separation between the magnetic head and the magnetic circuit.

A still further object of the present invention is to provide a head access mechanism which allows to reduce the space in the direction perpendicular to the extension of the magnetic disk plane.

A still further object of the present invention is to provide a head access mechanism which eliminates the drawback in the existing head access mechanism described above.

A still further object of the present invention is to provide a head access mechanism which determines with high precision the position of the head in the rolling direction.

Briefly described, these and other objects of the present invention are accomplished by the provision of an improved head access mechanism comprising a carriage with magnetic head which is movable along a straight line, a magnetic circuit with slender magnetic gaps which are open toward the magnetic disk in the direction of carriage motion, and a moving-coil type linear motor, consisting of the magnetic gaps of the magnetic circuit and the movable coil, which puts the carriage in motion. In this head access mechanism, the magnetic circuit is so constructed as to have the two magnetic loops, each being associated with the magnetic gaps, to be formed approximately symmetrically on a plane parallel to the magnetic disk plane, and the carriage is arranged to find itself between these magnetic loops.

BRIEF DESCRIPTION OF THE DRAWING

These and other objects, features, and advantages of the present invention will be more apparent from the following description of a preferred embodiment, taken in conjunction with the accompanying drawings, in which:

FIG. 1b is a front view of the head access mechanism shown in FIG. 1a;

FIG. 2 is a drawing depicting the state of magnetic flux leak from the magnetic circuit of the head access mechanism shown in FIG. 1a;

FIG. 3b is a front view of the head access mechanism shown in FIG. 3a;

FIG. 4a is a side view which shows the concrete construction of the first embodiment of the present invention shown in FIG. 3a;

FIG. 4b is a plane view of the head access mechanism shown in FIG. 4a;

FIG. 5b is a front view of the head access mechanism shown in FIG. 5a;

DESCRIPTION OF THE PREFERRED EMBODIMENTS

Figure 1A:
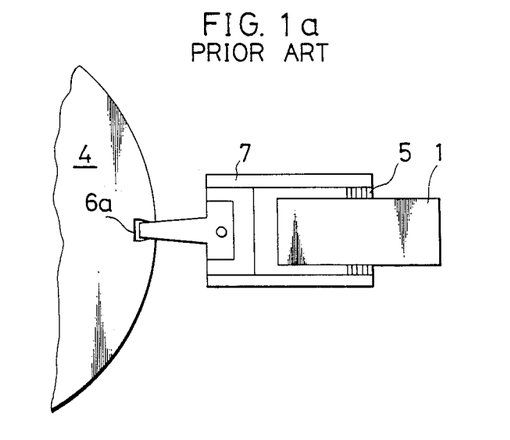
FIG. 1a is a plane view of a simplified construction of a prior art head access mechanism.
Figure 1B:
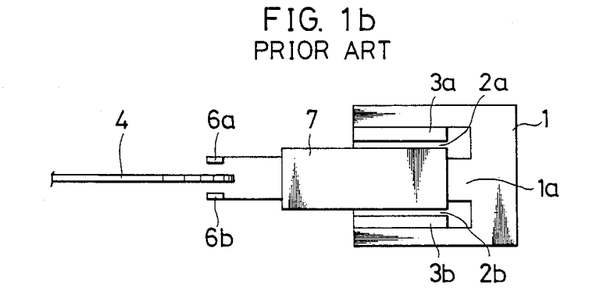
Figure 2:
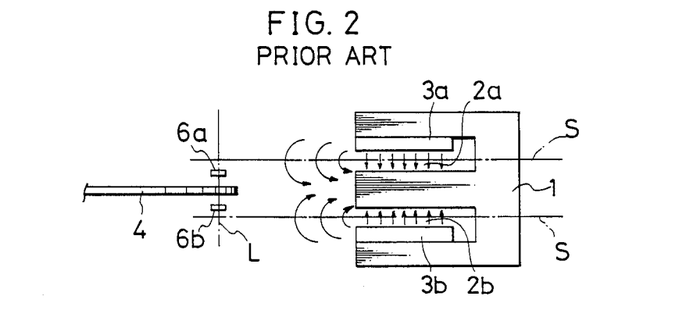

To facilitate the understanding of the present invention, a brief reference will be made to a prior art head access mechanism illustrated in FIGS. 1a, 1b, and 2.

As shown, the usual head access mechanism possesses yoke 1 which forms a magnetic circuit and is shaped in the form of the letter E with slender magneic gaps 2a and 2b. Attached to each of the magnetic gaps 2a and 2b are magnets 3a and 3b in order to keep the magnetic flux of the magnetic gaps 2a and 2b to point toward the central yoke 1a. The yoke 1 is arranged in such a way to have the magnetic gaps 2a and 2b to open opposing a magnetic disk 4 on the upper and lower sides of the extension of the magnetic disk plane. Therefore, the magnetic loops of the magnetic circuit formed by the yoke 1 become perpendicular to the plane on which the magnetic disk is placed. A movable coil 5 is wound around the central yoke 1a of the yoke 1 and through the magnetic gaps 2a and 2b, and a moving-coil type linear motor is formed by the movable coil 5 and the yoke 1. In the construction described above, the movable coil 5 moves along the central yoke 1a, and the carriage 7 with the magnetic heads 6a and 6b is attached to the movable coil 5. The movable coil 5 is so arranged for the heads to gain access to the magnetic disk by means of a linear guiding mechanism which is not shown in the illustration.

The prior art head access mechanism constructed and operated as described above possesses various problems, as mentioned earlier, such as an increase in the size and weight of the carriage, the accompanying deterioration in the energy efficiency and an increase in the size of the head access mechanism as a whole, and so forth.

The present invention is successful to eliminate such problems and will now be described with reference to FIGS. 3a-5d.

Figure 3A:
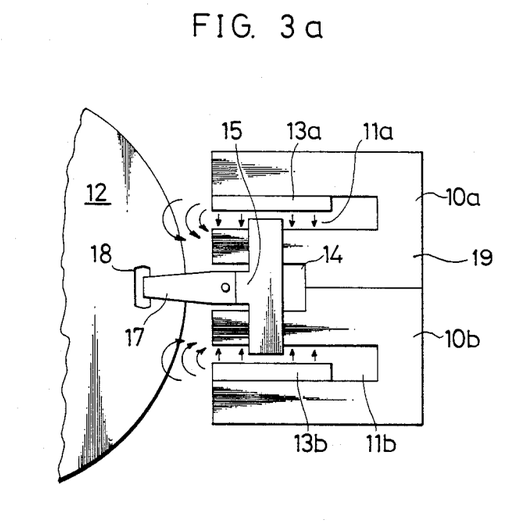
FIG. 3a is a plane view depicting an application of a head access mechanism embodying the present invention to a rigid magnetic disk.
Figure 3B:
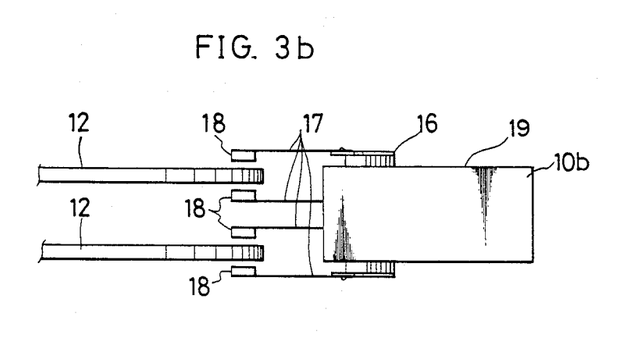

As shown in FIGS. 3a and 3b, the head access mechanism embodying the present invention includes, in order to form a magnetic circuit, yokes 10a and 10b with approximate form of the letter U with respective slender magnetic gaps 11a and 11b. These yokes 10a and 10b are so combined and arranged as to form a shape of the letter E in a plane parallel to the plane on which a rigid magnetic disk 12 is placed. The magnetic gaps 11a and 11b with respective magnets 13a and 13b are mutually separated by a predetermined distance and have their openings opposing the magnetic disk 12 in the extension of the magnetic disk plane. The magnetic flux direction due to each of the magnets 13a and 13b lies in the direction of union of the yokes 10a and 10b so that there are formed two magnetic loops in each of the yokes 10a and 10b with their plane of union as the symmetry plane. These magnetic loops lie in a plane which is parallel to the magnetic disk plane, as shown in FIG. 3a. In other words, if the upper surface 19 of the E-shaped yoke (the surface in the form of letter E) is termed a first surface, the first surface 19 is formed parallel to the plane of placement of the magnetic disk 12. In the central part of the E-shaped magnetic circuit formed by the yokes 10a and 10b, there is formed an indentation 14 on the surface facing the magnetic disk 12 in the same direction as the magnetic gaps 11a and 11b. Received in this indentation 14 is a carriage 15 which is movable along the indentation 14. A linear motor is formed by a movable coil 16, which is wound through magnetic gaps 11a and 11b around the central part of the E-shaped magnetic circuit formed by the yokes 10a and 10b, and the magnetic circuit with two magnetic loops, and the carriage 15 is made mobile by means of the linear motor. Such a carriage 15 has flexures 17 which support a plurality of heads that are extending in the direction of the open end of the indentation 14. As shown in FIG. 3b, the flexures 17 which are arranged along a line, extend in the direction parallel to the planes of the magnetic disks 12, and magnetic heads 18 are attached on each of the free ends of the flexures 17.

According to the above construction, the planes through which maximum flux leak from the magnetic circuit take place, that is the planes perpendicular to the magnetic flux direction of the magnetic gaps 11a and 11b, become parallel to the line joining the magnetic disks 12, as is shown in FIG. 3b. The magnetic heads 18 are located between the two magnetic loops that generate the abovementioned flux leak, and hence the flux leak in the vicinity of the magnetic heads 18 can be made very small because the line joining two heads does not cross the planes of maximum flux leak. As a result, the separation between the magnetic circuit and the magnetic heads does not have to be large, and consequently, the carriage 15 can be made small both in size and weight.

In addition, the space in the perpendicular direction to the magnetic disk planes can be reduced since the yokes 10a and 10b are so united and arranged as to shape the form of the letter E on a plane parallel to the planes on which the magnetic disks 12 are placed.

Figure 4A:
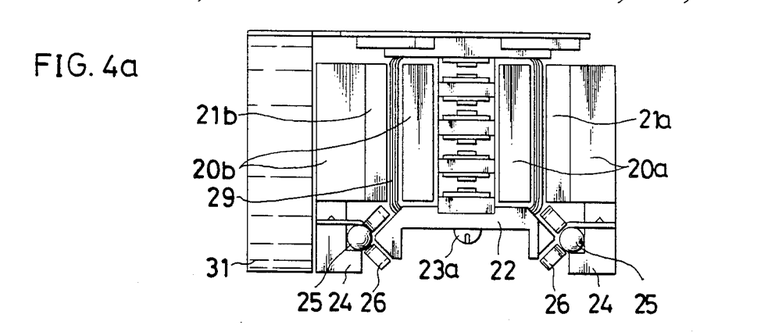
Figure 4B:
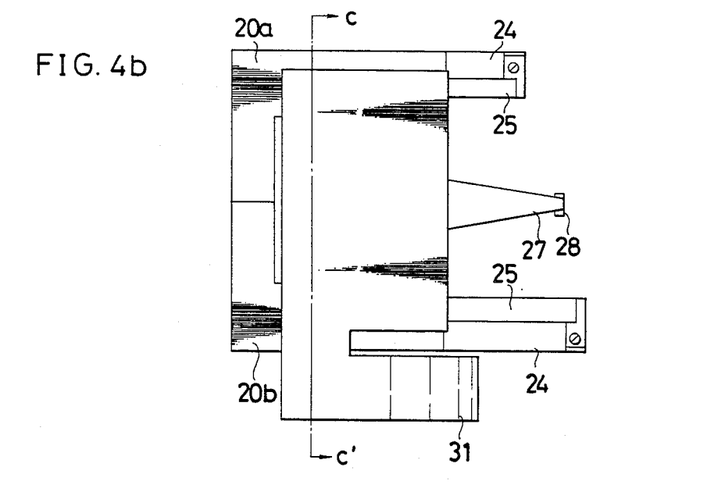
Figure 4C:
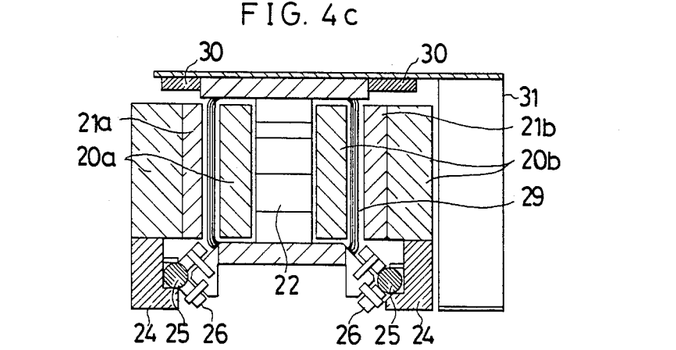
FIG. 4c is a cross-sectional view along the line c–c' of FIG. 4b.
Figure 4D:
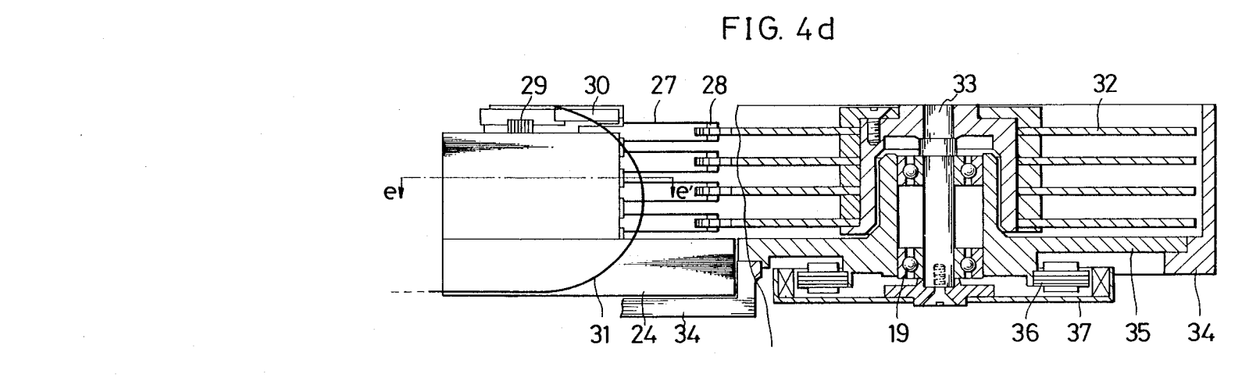
FIG. 4d is a partial cut-away front view which depicts the state of installation of the head access mechanism shown in FIG. 4a on the driving device of a rigid magnetic disk.
Figure 4E:
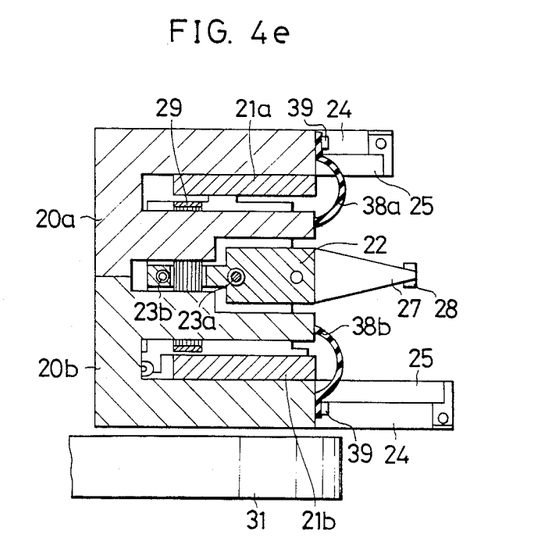
FIG. 4e is a cross-sectional view along the line e-e' of FIG. 4d.

FIGS. 4a-4e show the concrete construction of the first embodiment of the present invention described above, wherein the yokes 20a and 20b correspond respectively to the yokes 10a and 10b of FIG. 3a. As shown in FIG. 4e, these yokes 20a and 20b have a common indentation in the central portion where they are united, in addition to their respective slender magnetic gaps. On each of the slender magnetic gaps there are attached rare-earth or ferrite magnets 21a and 21b which generate the two magnetic loops as mentioned in conjunction with FIGS. 3a and 3b. Blocking each of the open ends opposing the rigid magnetic disks 32 (for convenience they are shown in FIG. 4d only) of the magnetic gaps of the yokes 20a and 20b, there are fixed with nuts magnetic flux collection plates 38a and 38b for absorbing the leaking flux. The magnetic flux collection plates 38a and 38b have the same circular arc form, with their respective centers on the open end planes of the magnetic gaps, with one of their respective ends attached by nuts 39 onto the yokes 20a and 20b, respectively, while the other ends come in contact with the yokes 20a and 20b. In the indentation 14 there is installed a mobile carriage 22 with a stacking structure, fixed by means of the nuts 23a and 23b. The carriage 22 moves back and forth relative to the rigid magnetic disks 32 along the guiding rails 25 that are furnished on the frame 24 of the head access mechanism, with the help of the bearings 26. As shown in FIGS. 4a and 4e, the carriage 22, which extends within the indentation in the direction of thickness of the yokes 20a and 20b, has a plurality of flexures 27 along the direction of its extension, with magnetic heads 28 attached at each end of the flexures 27. Through the yokes 20a and 20b there is wound a movable coil 29 whose top and bottom ends are fixed to the carriage 22. For processing signals from the magnetic heads 28 there are equipped, on the carriage, head integrated circuits 30 whose signals are taken out through a flexible cable 31. The magnetic disk, which is shown in FIG. 4d alone, rotates, together with the spindle 33 which is arranged pierced through the center, relative to the base 34 and the spindle case 35. The power for rotating the spindle 33 is supplied by a motor formed by the stator 36 and the rotor 37 via the bearings 19.

As is clear from the above description, the head access mechanism according to the present embodiment may be made small in size since the carriage is arranged to be able to retreat deep into the space where the yokes 20a and 20b are united. In this case, the magnetic flux collection plates 38a and 38b which absorb the leaking flux not only suppress the flux leak from the magnetic circuit to a very low level but also reduce the electromagnetic noise generated by the movable coil 29. Therefore, the separation between the magnetic circuit and the magnetic heads 28 can be made small, which contributes to making the size of the carriage small.

Figure 4F:
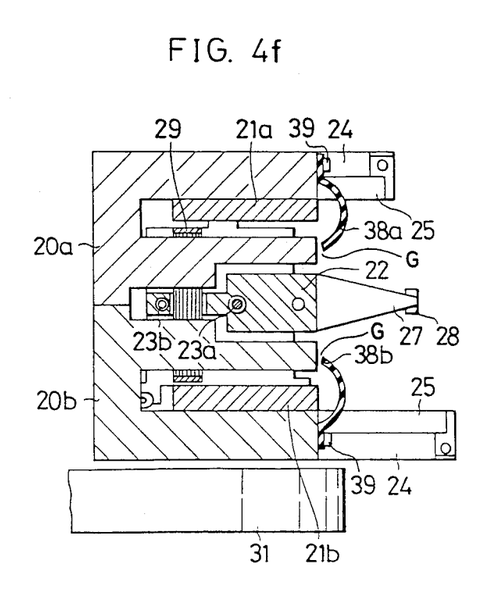
FIG. 4f illustrates a modified embodiment of the invention of FIG. 4e.

Moreover, as to the contact between the yokes 20a and 20b and the magnetic flux collection plates 38a and 38b, it is preferred to have a somewhat loose connection that permits the existence of effective air gaps, G, between them, as shown in FIG. 4f. The reason for this is that if the contact between the yokes 20 and the magnetic flux collection plates 38a and 38b is too close, the magnetic flux of the magnetic circuit flows into the flux collection plates 38a and 38b to such an extent to saturate them, resulting in a large flux leak from the surface of the flux collection plates 38a and 38b. It is possible to, insert seals made of a nonmagnetic material in the gaps between the yokes 20 and the magnetic flux collection plates 38a and 38b and this may accomplish the same purpose.

Next, referring to FIGS. 5a–5d, a description will be given of a modified embodiment of the head access mechanism according to the present invention as applied to flexible magnetic disks such as the floppy disks.

Since the basic construction of this modified embodiment is similar to that of the first embodiment shown in FIG. 3a, the same referrence numerals as in the first embodiment will be used for the same elements by omitting detailed explanations.

Figure 5A:
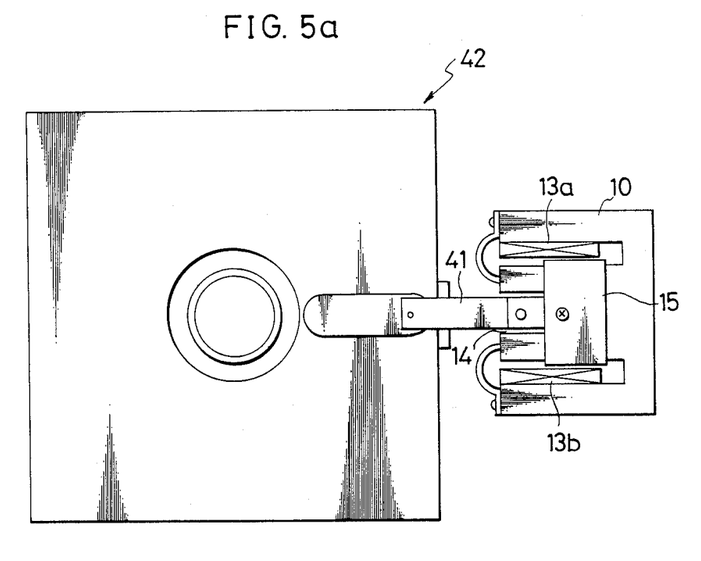
FIG. 5a is a plane view of a modified example of applying the head access mechanism according to the present invention to a flexible magnetic disk.
Figure 5B:
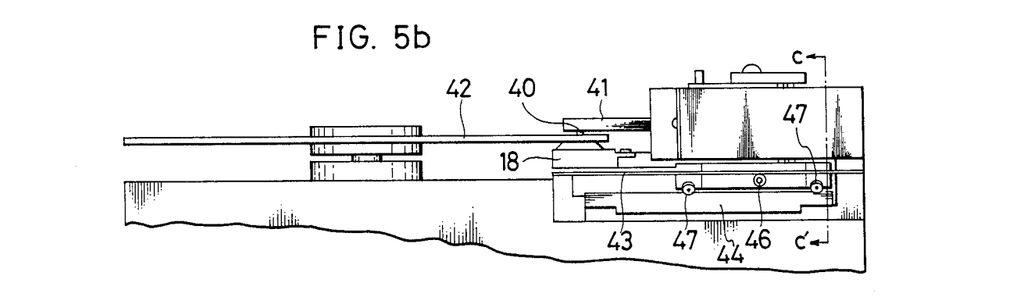
Figure 5C:
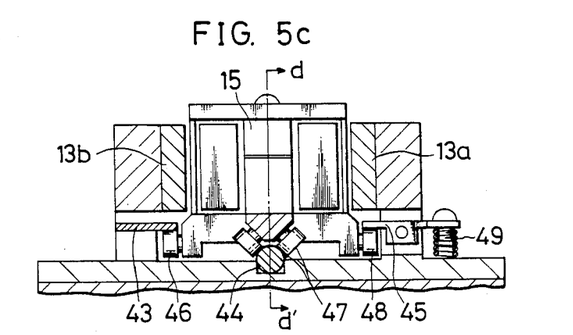
FIG. 5c is a cross-sectional view along the line c-c' of FIG. 5b.
Figure 5D:
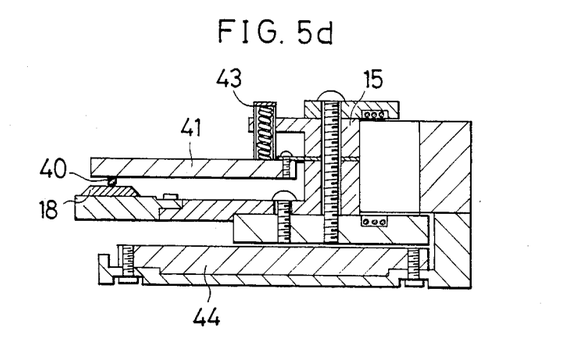
FIG. 5d is a cross-sectional view along the line d-d' of FIG. 5c.

In this modified embodiment, there are installed on the carriage 15, which is received movable in the indentation 14 of the yoke 10, a head 18 and a pad arm 41 that supports the pad 40 in such a way as to hold the floppy disk 42 by pinching it with the pad 40 and the head 18. As shown in FIG. 5d, in the upper part of the carriage 15 there is attached a weighing spring 43 in order to push the pad 40 to bring the floppy disk 42 to come to a close contact with the head 18. Moreover, as shown in FIG. 5c, the carriage 15 moves back and forth along the guiding rails 46, 47, and 48 that are equipped on the respective rails. On the rail 45 there is attached a prepressing spring 49 for insuring the correct contact of the carriage to the bearings.

In summary, according to the present invention wherein the head access mechanism is so constructed to have the magnetic heads to be small, it becomes possible to reduce the separation between the magnetic heads and the magnetic circuit, and accordingly, reduce also the size and weight of the carriage. This make it possible to realize a small-sized head access mechanism with high efficiency which requires small amount of electricity input. Moreover, because of the construction in which the yoke shapes the form of the letter E in a plane parallel to the plane of placement of tke magnetic disk, it is also possible to reduce the required space along the direction perpendicular to the magnetic disk plane. Furthermore, since the driving forces on the carriage act symmetrically relative to the center of gravity, the chance of generating a rotational resonance is very slight. Thus it provides a driving mechanism with an extremely high precision in position determination.

Various modifications will become possible for those skilled in the art after receiving the teachings of the present disclosure without departing from the scope thereof.

What is claimed is:

1. A head access mechanism for accessing magnetic heads to a desired position on at least one magnetic disk in a magnetic device, which comprises:
    (a) magnetic loop generating means having geneally an E-shaped yoke formed by two U-shaped yokes disposed together in a longitudinal direction thereof and abutting together to form a central yoke portion,
    (b) a magnet provided on one side of a wall of each U-shaped yoke of the E-shaped yoke and forming a magnetic gap between each magnet and said central yoke portion;
    (c) a magnetic flux collection plate provided across open ends of each U-shaped yoke opposing the magnetic disk and having a form of a circular arc, one end of each collection plate being fixed only to the yoke while the other end is spaced from the yoke by a slight gap, to thereby mitigate saturation of each collection plate, each collection plate collecting leakage flux of a magnetic circuit;
    (d) an indentation formed in the central yoke portion of the E-shaped yoke;
    (e) a movable coil surounding said central yoke portion having said indentation and movable along said central yoke portion by a carriage attached to said movable coil; and
    (f) a plurality of magnetic heads mounted to said carriage and movable together with said movable coil and said carriage,
    (g) a first E-shaped surface of said E-shaped yoke being formed parallel to the plane of placement of the magnetic disk, thereby reducing the flux leakage in the vicinity of the magnetic heads.

* * * * *